(12) United States Patent
Legatt (10) Patent No.: US 7,363,680 B2
(45) Date of Patent: Apr. 29, 2008

(54) FLOOR-CLEANING MACHINE WITH MANUAL ADJUSTMENT FOR TWO DISTINCT AND REPEATABLE FLUID FLOW RATES

(75) Inventor: Donald J. Legatt, St. Michael, MN (US)

(73) Assignee: Nilfisk-Advance, Inc., Plymouth, MN (US)

( * ) Notice: Subject to any disclaimer, the term of this patent is extended or adjusted under 35 U.S.C. 154(b) by 826 days.

(21) Appl. No.: 10/687,482

(22) Filed: Oct. 15, 2003

(65) Prior Publication Data

US 2005/0081319 A1    Apr. 21, 2005

(51) Int. Cl.
*A47L 11/20* (2006.01)
(52) U.S. Cl. ............... 15/320; 15/340.2; 15/340.3; 15/401; 251/207
(58) Field of Classification Search ............ 15/320, 15/321, 322, 340.2, 340.3; 251/207
See application file for complete search history.

(56) References Cited

U.S. PATENT DOCUMENTS

| | | | | |
|---|---|---|---|---|
| 3,134,405 | A | * | 5/1964 | White et al. ............ 251/207 |
| 3,444,577 | A | | 5/1969 | Koland .................. 15/50 |
| 4,458,377 | A | | 7/1984 | Frohbieter ............. 15/320 |
| 4,655,078 | A | * | 4/1987 | Johnson ................ 251/207 |
| 5,168,599 | A | | 12/1992 | Williams ............... 15/346 |
| 5,331,713 | A | | 7/1994 | Tipton ................. 15/320 |
| 5,784,755 | A | | 7/1998 | Karr et al. ............ 15/334 |
| 5,937,475 | A | | 8/1999 | Kasen et al. ........... 15/320 |
| 6,158,081 | A | | 12/2000 | Kasen et al. ........... 15/320 |
| 6,247,202 | B1 | | 6/2001 | Lesco et al. ........... 15/320 |
| 6,421,862 | B2 | | 7/2002 | Lesco et al. ........... 8/158 |
| 6,513,188 | B2 | | 2/2003 | Zahuranec et al. ...... 15/320 |
| 6,681,442 | B2 | * | 1/2004 | Coates et al. ......... 15/320 |

(Continued)

FOREIGN PATENT DOCUMENTS

EP    0 843 116 A2    5/1998

(Continued)

*Primary Examiner*—Theresa T Snider
(74) *Attorney, Agent, or Firm*—Alan Kamrath; Kamrath & Associates PA (57) ABSTRACT

A floor-cleaning machine (10) has a chassis (12) that is mobile on a surface and carries an agitating mechanism (14) to engage the surface. A fluid delivery system (18) conveys fluid from a reservoir (16) to the surface proximate the agitating mechanism (14). The fluid delivery system (18) includes a flow control valve (20) having a body (24) and a flow control member in the form of a ball (22) constrained within the body (24) and rotatable about an axis. A first passage (30) and a second passage (32) are defined in the ball (22), with the second passage (32) having a cross sectional area smaller than a cross sectional area of the first passage (30). The ball (22) is pivotable between a high flow position and a low flow position. In the high flow position, the ball (22) is positioned to allow fluid flow from a upstream duct (26) to a downstream duct (28) through the first passage (30). In the low flow position, the ball (22) is positioned to allow fluid flow from the upstream duct (26) to the downstream duct (28) through the second passage (32). The fluid flow rates in the high and the low flow positions are each distinct and repeatable with adjustment of the ball (22), with the low flow position allowing a lesser fluid flow rate than the high flow position.

13 Claims, 5 Drawing Sheets

U.S. PATENT DOCUMENTS

| | | | |
|---|---|---|---|
| 2002/0092115 A1 | 7/2002 | Zahuranec et al. | 15/320 |
| 2003/0019068 A1 | 1/2003 | Field et al. | 15/320 |
| 2003/0019069 A1 | 1/2003 | Field et al. | 15/320 |
| 2003/0019070 A1 | 1/2003 | Field et al. | 15/320 |
| 2003/0019071 A1 | 1/2003 | Field et al. | 15/320 |
| 2003/0046788 A1 | 3/2003 | Kent et al. | 15/320 |
| 2003/0070249 A1 | 4/2003 | Lehman et al. | 15/320 |
| 2003/0110588 A1 | 6/2003 | Zahuranec et al. | 15/320 |

FOREIGN PATENT DOCUMENTS

| | | |
|---|---|---|
| EP | 0 886 092 A1 | 12/1998 |
| GB | 1 304 160 | 1/1973 |
| WO | WO03011098 | 2/2003 |
| WO | WO03011099 | 2/2003 |
| WO | WO03011100 | 2/2003 |

* cited by examiner

FLOOR-CLEANING MACHINE WITH MANUAL ADJUSTMENT FOR TWO DISTINCT AND REPEATABLE FLUID FLOW RATES

BACKGROUND

The present invention generally relates to floor-cleaning machines and more particularly to a floor-cleaning machine with manual adjustment for two distinct and repeatable fluid flow rates.

Water may be dispensed in floor-cleaning machines by manually pushing on a lever, which in turn pivots a ball valve, which receives solution from a reservoir. The ball valve includes a ball rotatable in a duct. A diametric passage of the ball can be aligned with the duct for maximum fluid flow rate and can be positioned perpendicular to the duct to check the fluid flow. The ball can be pivoted between the two extremes to vary the fluid flow rate. The various rates are not consistent and don't provide accurate settings that are repeatable without extensive operator involvement. Also, although variable, it is common for an operator to run the machine with the ball valve at a maximum fluid flow rate even when a lesser flow rate would be adequate for cleaning. At the maximum fluid flow rate, it is necessary to fill the reservoir more frequently, which is time consuming for the operator. Additionally, more cleaning chemical is used at a higher flow rate which unnecessarily adds to the cost of cleaning.

Therefore, there is a need for a novel floor-cleaning machine to overcome deficiencies encountered in prior floor-cleaning machines.

There is also a need for a novel flow control valve to overcome deficiencies encountered in prior fluid flow control.

SUMMARY

The present invention solves these needs and other problems in the field of fluid flow control by providing, in a preferred form, a flow control valve including a body and a flow control member constrained within the body. The body has an upstream duct and a downstream duct, wherein the upstream duct is adapted to receive a fluid into the body, and the downstream duct is adapted to discharge the fluid from the body. The flow control member is located between the upstream duct and the downstream duct and is rotatable about an axis. A first passage and a second passage are defined by the flow control member. The second passage has a cross sectional area smaller than a cross sectional area of the first passage. The flow control member is pivotable between a high flow position and a low flow position and governs fluid flow between the upstream duct and the downstream duct. In the high flow position, an entrance to the first passage is in communication with the upstream duct to allow fluid flow from the upstream duct to the downstream duct through the first passage. In the low flow position, an entrance to the second passage is in communication with the upstream duct to allow fluid flow from the upstream duct to the downstream duct through the second passage. The low flow position allows a fluid flow rate that is lesser than a fluid flow rate in the high flow position. The fluid flow rates in the high flow position and the low flow position are each distinct and repeatable with adjustment of the flow control member.

In further aspects of the present invention, a floor-cleaning machine is provided. The floor-cleaning machine has a chassis that is mobile on a surface such as a floor surface and that carries an agitating mechanism to engage the surface. A reservoir is carried on the chassis and is adapted to receive and contain a fluid. A fluid delivery system conveys the fluid from the reservoir to the surface near the agitating mechanism. The fluid delivery system includes a flow control valve that has two distinct and repeatable rates of fluid flow. The flow control valve includes a body and a flow control member constrained within the body. The body has an upstream duct and a downstream duct, wherein the upstream duct is adapted to receive the fluid into the body, and the downstream duct is adapted to discharge the fluid from the body. The flow control member is located between the upstream duct and the downstream duct and is rotatable about an axis. A first passage and a second passage are defined the flow control member, with the second passage having a cross sectional area smaller than a cross sectional area of the first passage. The flow control member is pivotable between a high flow position and a low flow position and governs fluid flow between the upstream duct and the downstream duct. In the high flow position, an entrance to the first passage communicates with the upstream duct to allow fluid flow from the upstream duct to the downstream duct through the first passage. In the low flow position, an entrance to the second passage communicates with the upstream duct to allow fluid flow from the upstream duct to the downstream duct through the second passage. The low flow position allows a fluid flow rate that is lesser than a fluid flow rate in the high flow position. The fluid flow rates in the high and the low flow positions are each distinct and repeatable with adjustment of the flow control member.

It is thus an objective of the present invention to provide a novel flow control valve.

It is yet another objective of the present invention to provide a novel floor-cleaning machine including such novel flow control valve.

It is yet another objective of the present invention to provide such a novel floor-cleaning machine that has a flow control valve with two distinct and repeatable rates of fluid flow.

It is yet another objective of the present invention to provide such a novel floor-cleaning machine that is adjustable between a high flow position and a low flow position to attain the two distinct and repeatable rates of fluid flow to facilitate either quick cleaning or deep cleaning with minimal operator involvement.

It is yet another objective of the present invention to provide such a novel flow control valve that is manually adjustable between a high flow position and a low flow position to attain two distinct and repeatable rates of fluid flow.

These and further objectives of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

All figures are drawn for ease of explanation of the basic teachings of the present invention, only; the extensions of the figures with respect to number, position, relationship, and dimensions of the parts to form the preferred embodiment will be explained or will be within the skill of the art after the following description has been read and understood. Further, the exact dimensions and dimensional proportions to conform to specific force, weight, strength, fluid flow and similar requirements will likewise be within the skill of the art after the following description has been read and understood.

Where used in the various figures of the drawings, the same numerals designate the same or similar parts. Furthermore, when the terms "upstream," "downstream," "first," "second," and similar terms are used herein, it should be understood that these terms have reference only to the structure shown in the drawings as it would appear to a person viewing the drawings and are utilized only to facilitate describing the illustrative embodiment.

DESCRIPTION OF THE PREFERRED EMBODIMENT

Figure 1:
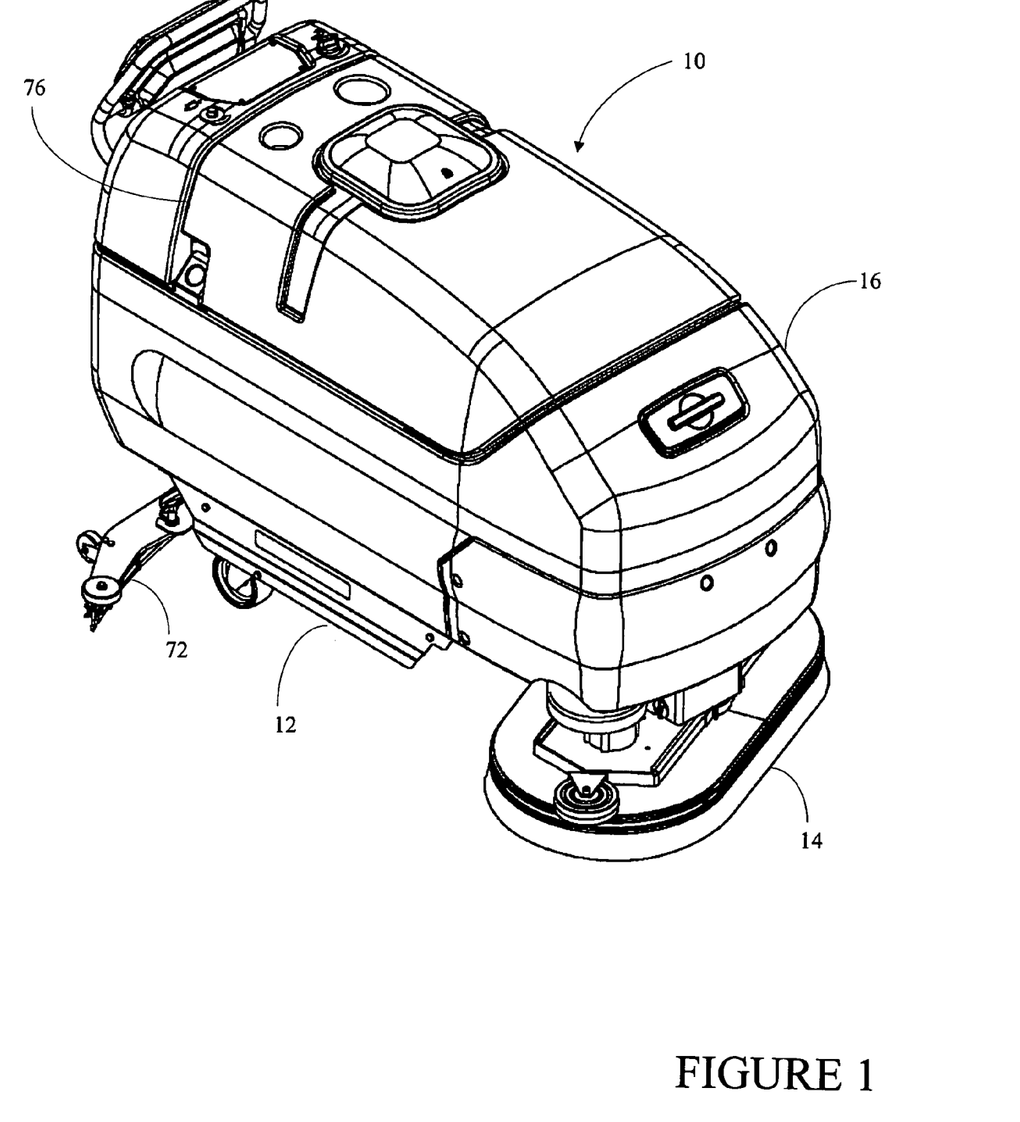
FIG. 1 shows a perspective view of a floor-cleaning machine according to the preferred teachings of the present invention.

A floor-cleaning machine constructed according to the preferred teachings of the present invention, is shown in the drawings and generally designated 10. In the most preferred form, the floor-cleaning machine 10 is utilized to scrub a surface, such as a floor surface. The floor-cleaning machine 10 includes a chassis 12 that is mobile and carries an agitating mechanism 14 such as a brushing mechanism, which is carried by the chassis 12 and engages and scrubs the surface.

A reservoir 16 is carried on the chassis 12 and receives and contains a fluid, generally a cleaning fluid, for cleaning the surface.

Figure 2:
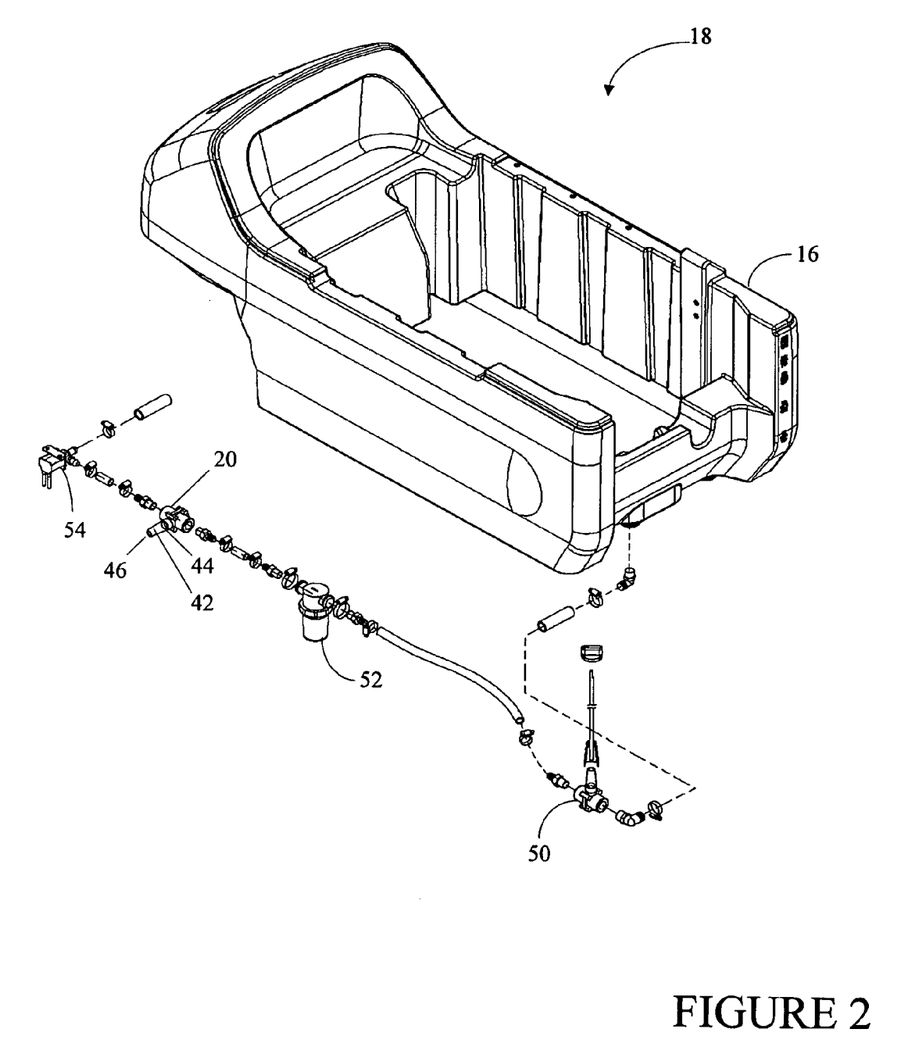
FIG. 2 shows an exploded perspective view of the fluid delivery system of the floor-cleaning machine of FIG. 1.
Figure 3:
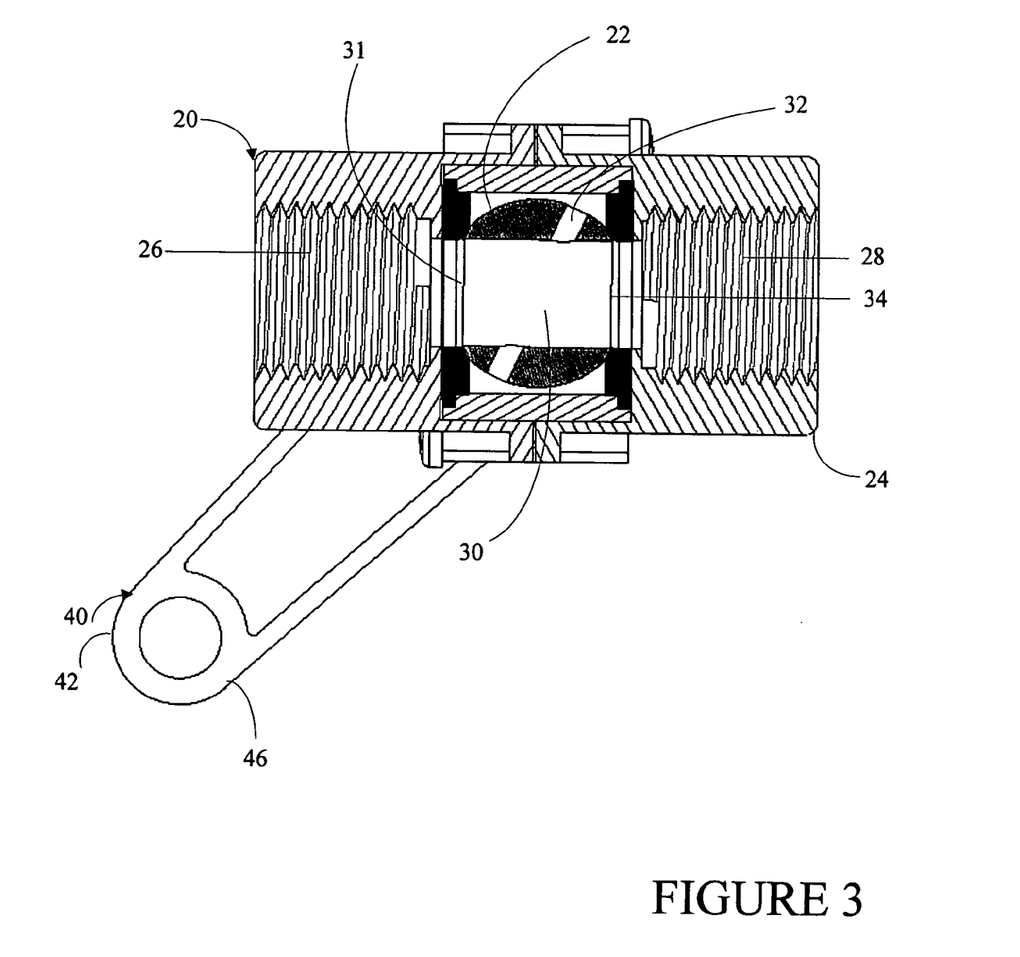
FIG. 3 shows a cross sectional view of a flow control valve of the fluid delivery system of FIG. 2 in a high flow position according to the teachings of the present invention.

A fluid delivery system 18 conveys the fluid from the reservoir 16 either directly or indirectly to the surface proximate and for contact with the agitating mechanism 14. The fluid delivery system 18 includes a flow control valve 20. The flow control valve 20 includes a flow control member shown in its most preferred form as a ball 22 that rotates about an axis and is contained within a body 24. An upstream duct 26 and a downstream duct 28 are defined interior the body 24 of the flow control valve 20. The ball 22 is intermediate the upstream duct 26 and the downstream duct 28. The upstream duct 26 receives the fluid into the body 24, and the downstream duct 28 discharges the fluid from the body 24. In the preferred form according to the teachings of the present invention, the upstream and downstream ducts 26 and 28 are adapted to connect to tubing.

A first passage 30 and a second passage 32 are defined in the ball 22 according to the teachings of the present invention. The second passage 32 has a cross sectional area parallel to the axis that is smaller than a cross sectional area of the first passage 30 parallel to the axis. In the preferred form according to the teachings of the present invention, the first passage 30 and the second passage 32 each have generally circular cross sections of a constant size and are linear and diametric to the ball 22. Also in the preferred form, the first passage 30 and the second passage 32 are at an angle in the range of 65 to 75 degrees to each other and are in communication at an intersection.

Figure 5:
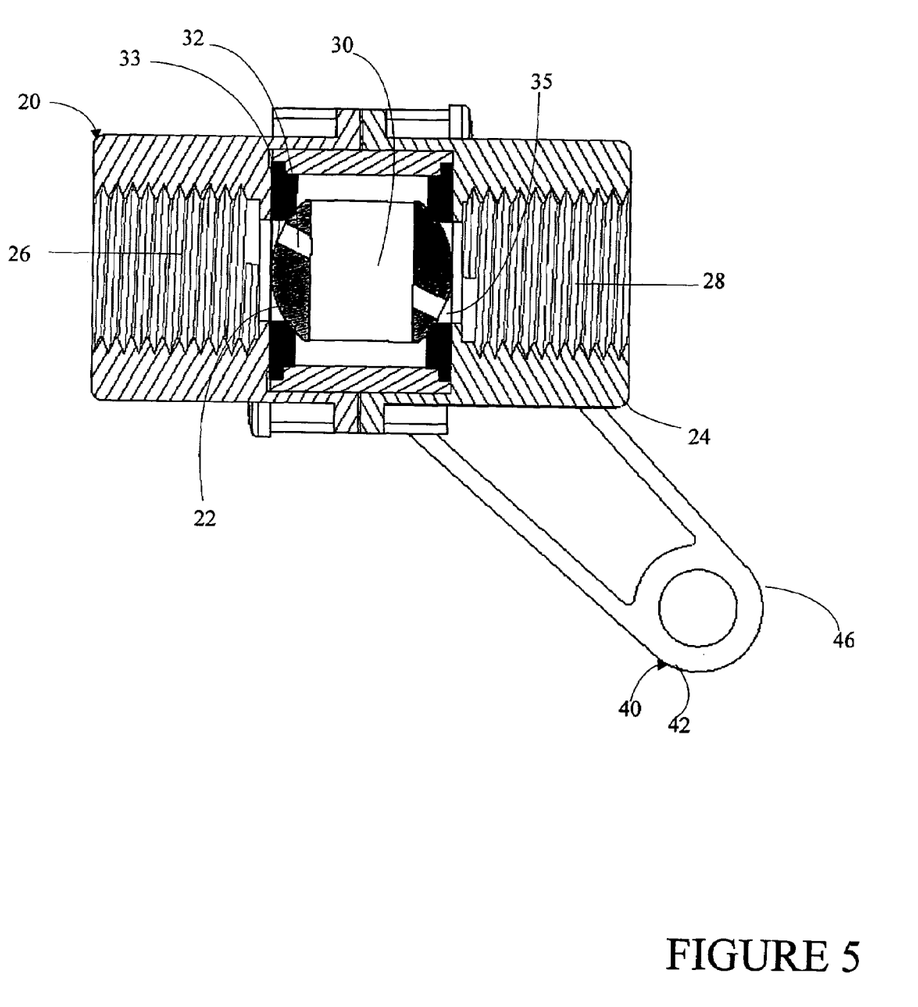
FIG. 5 shows a cross sectional view of the flow control valve of the fluid delivery system of FIG. 2 in a low flow position according to the teachings of the present invention.

According to the teachings of the present invention, the ball 22 is pivotable between a low flow position and a high flow position and governs fluid flow between the upstream duct 26 and the downstream duct 28. The first passage 30 has an entrance 31 and an exit 34. The second passage 32 has an entrance 33 and an exit 35. The entrance 33 of the second passage 32 is distinct from the entrance 31 of the first passage 30. When the ball 22 is in the high flow position, the first passage 30 is aligned such that the entrance 31 of the first passage 30 is in communication with the upstream duct 26 and the exit 34 of the first passage 30 is in communication with the downstream duct 28 to allow fluid flow through the first passage 30. In the low flow position, the ball 22 is aligned such that the entrance 33 of the second passage 32 is in communication with the upstream duct 26 and the exit 35 of the second passage 32 is in communication with the downstream duct 28 to allow fluid flow through the second passage 32. The fluid flow rate through the second passage 32 in the low flow position is less than the fluid flow rate through the first passage 30 in the high flow position. The fluid flow rates in each of the positions are accurate and are repeatable by pivoting the ball 22 to the low flow or the high flow position. In the preferred form according to the teachings of the present invention, the exit 34 of the first passage 30 is distinct from the exit 35 of the second passage 32.

Figure 4:
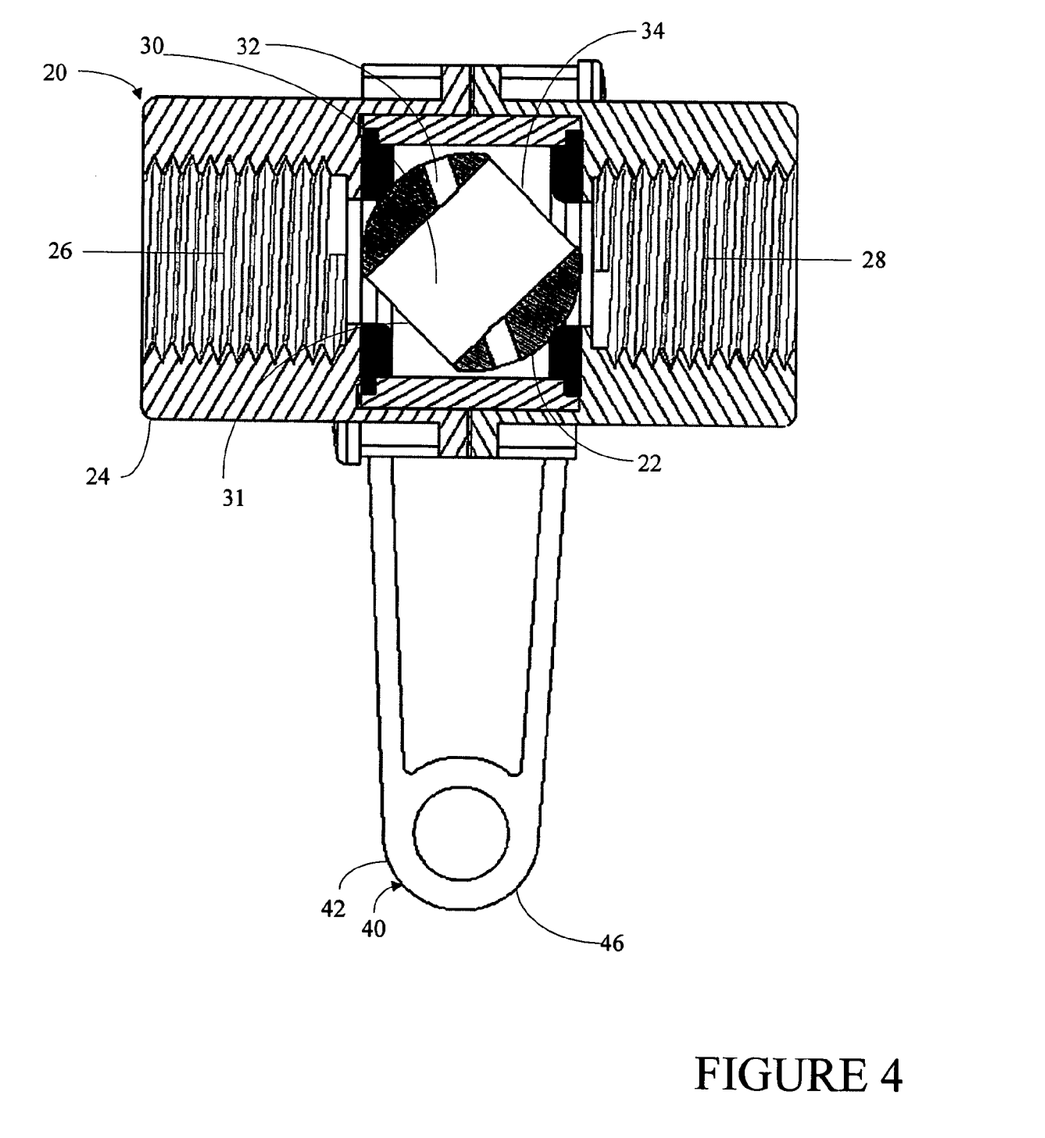
FIG. 4 shows a cross sectional view of the flow control valve of the fluid delivery system of FIG. 2 in one of a plurality of intermediate positions according to the preferred teachings of the present invention.

In the preferred form according to the teachings of the present invention, the ball 22 is adjustable to a plurality of positions intermediate the high flow position and the low flow position, and an actuator 40 rotates the ball 22 between the plurality of positions. In the most preferred form according to the teachings of the present invention, the actuator 40 is a lever 42. The lever 42 is elongated and has a first end 44 and a second end 46. The first end 44 of the lever 42 in the most preferred form is connected to the axis of the ball 22 and the second end 46 pivots about the first end 44 to rotate the ball 22 between the plurality of positions. In the most preferred form according to the teachings of the present invention, a distance between the entrance 31 of the first passage 30 and the entrance 33 of the second passage 32 is greater than a diameter of the upstream duct 26 so that the ball 22 is pivotable to a position where the upstream duct 26 is not in communication with either of the entrances 31 and 33 resulting in no fluid flow between the upstream duct 26 and the downstream duct 28.

In the most preferred form according to the teachings of the present invention, the fluid delivery system 18 also includes an operating valve 50 and a filter 52 intermediate the reservoir 16 and the flow control valve 20. In the preferred form, the operating valve 50 controls fluid flow out of the reservoir 16 and allows an operator to shut off fluid flow to facilitate cleaning or changing the filter 52. In the preferred form, the operating valve 50 is variable and allows the operator to adjust fluid flow up to the maximum fluid flow rate allowed by the flow control valve 20. The filter 52 is provided in the preferred form to avoid plugging of the flow control valve 20, particularly the second passage 32, by debris. In the most preferred form, an electric solenoid valve 54 is located between the flow control valve 20 and the agitating mechanism 14 to further control fluid delivery to the surface while the floor-cleaning machine 10 is in operation. Suitable connections and plumbing are provided to complete the fluid delivery system 18.

The floor-cleaning machine 10 has a recovery system for soiled fluid in the preferred form according to the teachings of the present invention. The recovery system includes a squeegee 72, a vacuum system to remove the soiled fluid from the surface and a recovery fluid reservoir 76. The soiled fluid is received and held in the recovery fluid reservoir 76 until disposal.

Now that the basic teachings of the present invention, have been explained, many extensions and variations will be obvious to one having ordinary skill in the art. For example, although the floor-cleaning machine 10 according to the preferred teachings of the present invention, has been shown as including several features in combination believed to produce synergistic results, such features can be utilized singly and in other combinations with other features according to the teachings of the present invention. For example, although according to the teachings of the present invention, the floor-cleaning machine 10 with the fluid delivery system 18 including the operating valve 50, the filter 52, the flow control valve 20 and the electric solenoid valve 54 in combination provides precise and smooth flow of fluid between the reservoir 16 and the surface, the floor-cleaning machine 10 may be used without the operating valve 50, with the flow control valve 20 controlling starting and stopping of fluid flow, or with the components in different orientations to each other according to the teachings of the present invention.

Additionally, although in the preferred form shown the flow control member is shown and described as ball 22, the flow control member can take other types and forms according to the teachings of the present invention including but not limited to butterfly valves or cylinder valves that similarly include a flow control member that pivots about an axis to allow adjustment of flow rates.

Similarly, while the flow control valve 20 in the preferred form being formed of plastic is believed to be advantageous for many reasons including being inexpensive to manufacture, strong, lightweight, and chemically resistant, the flow control valve 20 could be formed from other material, such as but not limited to metal, without departing from the spirit or scope of the present invention.

Thus since the invention disclosed herein may be embodied in other specific forms without departing from the spirit of general characteristics thereof, some of which forms have been indicated, the embodiments described herein are to be considered in all respects illustrative and not restrictive. The scope of the invention is to be indicated by the appended claims, rather than by the foregoing description, and all changes, which come within the meaning, and ranges of equivalency of the claims are intended to be embraced therein.

The invention claimed is:

1. A floor-cleaning machine comprising, in combination: a chassis, with the chassis being mobile on a surface; an agitating mechanism carried by the chassis and which engages the surface; a reservoir carried by the chassis and adapted to receive and contain a fluid; a fluid delivery system that conveys the fluid from the reservoir to the surface proximate the agitating mechanism, with the fluid delivery system including a flow control valve, with the flow control valve having a body and a flow control member contained within the body, with the flow control member rotatable within the body about an axis; an upstream duct and a downstream duct defined interior the body of the flow control valve, with the flow control member intermediate the upstream duct and the downstream duct, with the upstream duct receiving the fluid into the body of the flow control valve and with the downstream duct discharging the fluid from the body of the flow control valve; the flow control member having a first position defining a first passage intermediate the upstream duct and the downstream duct, with the first passage having an entrance and an exit, with the first passage having a cross sectional area generally parallel the axis; and the flow control member having a second position defining a second passage intermediate the upstream duct and the downstream duct, with the second passage having an entrance and an exit, with the second passage having a cross sectional area generally parallel the axis and smaller than the cross sectional area of the first passage, with the flow control member pivotable between a low flow position and a high flow position and governing fluid flow between the upstream duct and the downstream duct, with the entrance to the first passage being in communication with the upstream duct and the exit of the first passage being in communication with the downstream duct in the high flow position and allowing fluid flow from the upstream duct to the downstream duct through the first passage, with the entrance to the second passage being in communication with the upstream duct and the exit of the second passage being in communication with the downstream duct in the low flow position and allowing fluid flow from the upstream duct to the downstream duct through the second passage, with a fluid flow rate through the second passage of the flow control valve being less in the low flow position than a fluid flow rate through the first passage of the flow control valve in the high flow position, with the fluid flow rates in the low flow position and the high flow position each being distinct and repeatable with adjustment of the flow control member between the low flow position and the high flow position.

2. The floor-cleaning machine of claim 1 further comprising, in combination: a filter in the fluid delivery system, with the filter intermediate the reservoir and the flow control valve.

3. The floor-cleaning machine of claim 2 further comprising, in combination: an operating valve in the fluid delivery system, with the operating valve intermediate the reservoir and the filter, with the operating valve effecting starting and stopping of fluid flow out of the reservoir to facilitate filter changes and being variable to provide operator adjustment of fluid flow up to the fluid flow rate allowed by positioning of the flow control valve.

4. The floor-cleaning machine of claim 1 further comprising, in combination: an electric solenoid valve in the fluid delivery system intermediate the flow control valve and the agitating mechanism, with the electric solenoid valve controlling fluid delivery to the surface.

5. The floor-cleaning machine of claim 4 with the flow control member being a ball pivotally adjustable to a plurality of positions intermediate the high flow and the low flow positions, with the first passage being oriented at an angle in the range of 65 to 75 degrees to the second passage, with the entrance to the first passage being at a distance from the entrance to the second passage, with the distance being greater than a diameter of the upstream duct, with the ball being pivotable to a position intermediate the low flow position and the high flow position where the upstream duct is not in communication with the entrance to the first passage and not in communication with the entrance to the second passage to impede fluid flow from the upstream duct to the downstream duct.

6. The floor-cleaning machine of claim 5 further comprising, in combination: a lever to rotate the ball between the low flow position and the high flow position, with the lever being elongated and having a first end and a second end, with the first end connected to the axis of the ball, with the second end pivotable about the first end to cause rotation of the ball.

7. The floor-cleaning machine of claim 1 further comprising, in combination: a recovery system for soiled fluid including a squeegee, and a recovery fluid reservoir in which the soiled fluid is received and held until disposal, with the recovery fluid reservoir being under vacuum to remove the soiled fluid from the surface.

8. The floor-cleaning machine of claim 7 with the fluid delivery system further comprising, in combination:
   a filter intermediate the reservoir and the flow control valve;
   an operating valve intermediate the reservoir and the filter, with the operating valve effecting starting and stopping of fluid flow out of the reservoir to facilitate filter changes and being variable to provide operator adjustment of fluid flow up to the fluid flow rate allowed by positioning of the flow control valve; and
   an electric solenoid valve intermediate the flow control valve and the agitating mechanism, with the electric solenoid valve controlling fluid delivery to the surface.

9. The floor-cleaning machine of claim 8 with the flow control valve formed of plastic and the upstream and downstream ducts being adapted to connect to tubing.

10. The floor-cleaning machine of claim 9 with the flow control member being a ball pivotally adjustable to a plurality of positions intermediate the high flow and the low flow positions, with the first passage being oriented at an angle in the range of 65 to 75 degrees to the second passage, with the entrance to the first passage being at a distance from the entrance to the second passage, with the distance being greater than a diameter of the upstream duct, with the ball being pivotable to a position intermediate the low flow position and high flow position where the upstream duct is not in communication with the entrance to the first passage and not in communication with the entrance to the second passage to impede fluid flow from the upstream duct to the downstream duct.

11. The floor-cleaning machine of claim 10 further comprising, in combination: a lever to rotate the ball between the low flow position and the high flow position, with the lever being elongated and having a first end and a second end, with the first end connected to the axis of the ball, with the second end pivotable about the first end to cause rotation of the ball.

12. The floor-cleaning machine of claim 1 with the flow control member being a ball pivotally adjustable to a plurality of positions intermediate the high flow and the low flow positions, with the first passage being oriented at an angle in the range of 65 to 75 degrees to the second passage, with the entrance to the first passage being at a distance from the entrance to the second passage, with the distance being greater than a diameter of the upstream duct, with the ball being pivotable to a position intermediate the low flow position and the high flow position where the upstream duct is not in communication with the entrance to the first passage and not in communication with the entrance to the second passage to impede fluid flow from the upstream duct to the downstream duct.

13. The floor-cleaning machine of claim 12 further comprising, in combination: a lever to rotate the ball between the low flow position and the high flow position, with the lever being elongated and having a first end and a second end, with the first end connected to the axis of the ball, with the second end pivotable about the first end to cause rotation of the ball.

\* \* \* \* \*